L. HAMMOND.

CLOCK.

APPLICATION FILED NOV. 25, 1921.

Reissued Mar. 7, 1922. 15,299.

INVENTOR.

Laurens Hammond

BY

Raymond A. Parker

ATTORNEY.

UNITED STATES PATENT OFFICE.

LAURENS HAMMOND, OF NEW YORK, N. Y., ASSIGNOR TO D. DWIGHT DOUGLAS, JOHN J. O'CONNOR, AND LAURENS HAMMOND, TRUSTEES, OF DETROIT, MICHIGAN.

CLOCK.

15,299. Specification of Reissued Letters Patent. Reissued Mar. 7, 1922.

Original No. 1,345,766, dated July 6, 1920, Serial No. 310,741, filed July 14, 1919. Application for reissue filed November 25, 1921. Serial No. 517,828.

*To all whom it may concern:*

Be it known that I, LAURENS HAMMOND, a citizen of the United States, residing at New York, county of New York, State of New York, have invented a certain new and useful Improvement in Clocks, and declare the following to be a full, clear, and exact description of the same, such as will enable others skilled in the art to which it pertains to make and use the same, reference being had to the accompanying drawings, which form a part of this specification.

This invention relates to clocks and consists of an improvement designed to render inaudible the ticking of a clock, or the noise accompanying the working of the escapement mechanism.

The object is to produce at a slight advance in cost a clock, the ticking of which will be inaudible but which will otherwise perform all the functions of a clock. In an alarm clock, such as shown in the drawing, the alarm mechanism will not in any way be altered and it will serve in the usual way its normal purpose.

Figure 1:
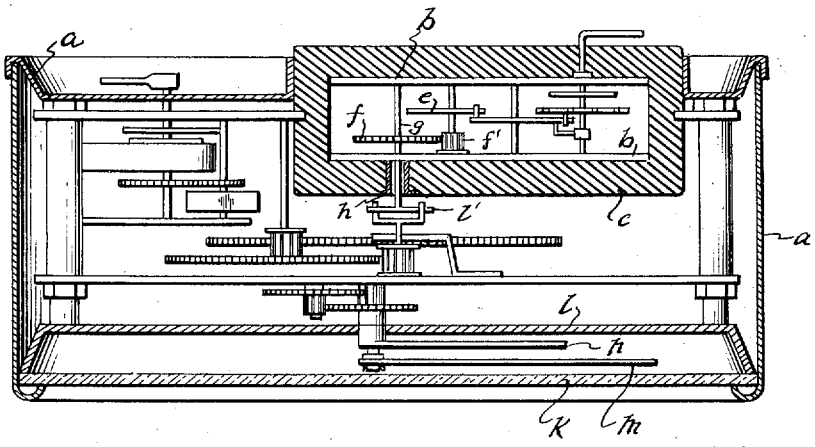
Figure 1 is a horizontal sectional view of a clock showing my improvement.

My improvement consists in the building of a clock, the working mechanism of which is disposed in two individual frames substantially as hereinafter described. Main frame *a* provided with a dial *l* and face plate *k* is the standard frame found in clocks of this type at the present time. The back wall of such main frame however is stamped out, as shown, to receive secondary frame *c*. It is apparent that the secondary frame *c* would not necessarily have to be positioned in this manner. It might be positioned entirely within or without the main frame of the clock. The clock frame can be in any particular form desired. The escapement mechanism could very easily be situated in the base frame of the clock and the remaining clock mechanism positioned in a superimposed frame. The method shown in the drawing is merely a convenient manner of positioning such sub-frame. The essential object is to provide a substantial sound-proof secondary frame which closes and separates the escapement mechanism from the remaining clock mechanism.

Secondary frame *c* is built to contain the escapement mechanism only. It is made of a sound deadening material so as to be substantially sound proof and render inaudible the ticking of the escapement mechanism. It was found in the development of this idea that the provision of an interior sound proof casing for the entire clock mechanism failed its purpose because of the necessary projecting metallic parts which serve as conveyers of sound. The secondary frame *c* therefore is pierced only by driving shaft *g* and regulator lever *d*. The escapement mechanism is supported within the sound proof frame by means of interior side plates *b*. *e* indicates the escapement wheel, *g* a driving shaft, *f* a gear wheel mounted thereon which meshes with gear wheel *f'*. Sufficient only of the working mechanism of the clock is shown to serve the purpose of this description. The hands of the clock are indicated at *m* and *n*.

Figure 2:
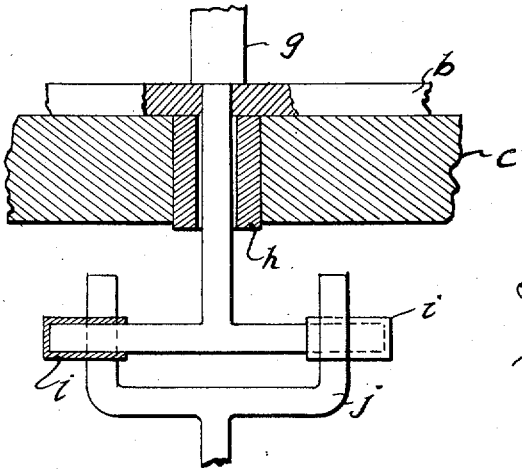
Fig. 2 is a detail view.

Fig. 2 is a preferred form of coupling whereby the escapement mechanism is connected with the remaining clock mechanism. The type represented is one form of universal coupling, *j* indicating the forked member. *i* is the sound deadening washers. *h* is a bushing for the shaft *g*.

What I claim is:

1. In a clock, a sound proof container disposed interior thereof containing the escapement mechanism separating the same from the remaining clock mechanism.

2. In a clock, in combination with a main frame inclosing the clock mechanism with the exception of the escapement mechanism, a substantially sound proof secondary frame inclosing and separating the escapement mechanism from the remaining clock mechanism, said sound proof container cut away to permit of working connection between said escapement mechanism and the remaining clock mechanism.

3. In a clock, in combination with a main frame which incloses and carries the working mechanism, a substantially sound proof sub-frame carried thereby, said sub-frame adapted to inclose and carry the escapement mechanism.

4. In a clock, in combination with a main frame which incloses the clock mechanism with the exception of the escapement mechanism, a substantially sound-proof secondary frame which incloses and carries such escapement mechanism, such secondary frame supported by said main frame and the interior wall of said secondary frame perforated to permit of connection between the mechanism carried by the main frame and the escapement mechanism carried by the secondary frame.

5. In a clock, in combination with the main frame, a substantially sound proof secondary frame inclosing the escapement mechanism, such secondary frame being supported by the main frame of the clock and provided with a passageway for a gear shaft of the escapement mechanism so as to workably connect said escapement mechanism with the remaining clock mechanism.

6. In a clock, in combination with the main frame adapted to contain the alarm and other clock mechanism, a substantially sound proof secondary frame interior thereof and supported thereby inclosing the escapement mechanism, a passageway through said secondary frame for the extension of a gear shaft of the escapement mechanism provided with a universal coupling for connection with the remaining clock mechanism.

7. In a clock, a soundproof container inclosing the escapement mechanism separating the same from the remainder of the clock mechanism but provided with a passageway through the wall thereof through which a connection can be made with the remaining clock mechanism.

8. In a clock, in combination with a frame which incloses and carries the clock mechanism with the exception of the escapement mechanism, a substantial sound proof secondary frame which incloses and carries the escapement mechanism, said frames adapted to permit of working connection between said escapement mechanism and the remaining clock mechanism.

9. In a clock, in combination, a substantially sound-proof container within which is disposed the escapement mechanism, and resilient sound-damping driving means engaging said escapement mechanism with the remaining clock mechanism.

10. In a clock, in combination, a sound-deadening wall separating that portion of the clock mechanism which includes the escapement from the remaining clock mechanism, and flexible non-sound conducting driving means extending through said wall engaging the escapement mechanism with the remaining clock mechanism.

11. In a clock, in combination, that portion of the clock mechanism which includes the escapement separated from the remaining clock mechanism by sound-deadening means, and flexible non-sound-conducting driving means engaging said escapement mechanism with the remaining clock mechanism.

12. In a clock in combination, the escapement mechanism, the remaining clock mechanism, and non-sound conducting driving means engaging said escapement mechanism with the remaining clock mechanism.

13. In a clock, in combination, the escapement mechanism as distinguished from the remaining clock mechanism, said remaining clock mechanism, communicating driving means connecting said escapement mechanism and remaining clock mechanism, and a substantially non-sound conducting section interposed in such driving means as a part thereof.

14. In a clock, in combination, the clock mechanism except a portion which includes the escapement, said portion including the escapement, and resilient sound-absorbing driving means connecting said escapement portion of the mechanism with the remaining clock mechanism.

LAURENS HAMMOND.